United States Patent
Yamada et al.

(10) Patent No.: US 10,404,428 B2
(45) Date of Patent: *Sep. 3, 2019

(54) TERMINAL DEVICE AND INTEGRATED CIRCUIT

(71) Applicant: Sharp Kabushiki Kaisha, Sakai, Osaka (JP)

(72) Inventors: Ryota Yamada, Sakai (JP); Takashi Yoshimoto, Sakai (JP); Kazuyuki Shimezawa, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/317,029

(22) PCT Filed: May 29, 2015

(86) PCT No.: PCT/JP2015/065507
§ 371 (c)(1),
(2) Date: Dec. 7, 2016

(87) PCT Pub. No.: WO2015/190313
PCT Pub. Date: Dec. 17, 2015

(65) Prior Publication Data
US 2017/0099123 A1   Apr. 6, 2017

(30) Foreign Application Priority Data

Jun. 10, 2014   (JP) ................................ 2014-119167

(51) Int. Cl.
*H04L 5/00* (2006.01)
*H04J 11/00* (2006.01)
(Continued)

(52) U.S. Cl.
CPC ............ *H04L 5/0032* (2013.01); *H04J 11/00* (2013.01); *H04J 11/005* (2013.01);
(Continued)

(58) Field of Classification Search
CPC .................................................... H04L 5/0073
See application file for complete search history.

(56) References Cited

U.S. PATENT DOCUMENTS

2017/0005744 A1* 1/2017 Li ...................... H04W 72/082

OTHER PUBLICATIONS

3GPP TSG-RAN WG1 #77, Remaining aspects of higer-layer signaling for NAICS, May 2014, 3GPP (Year: 2014).*

(Continued)

*Primary Examiner* — Said M Elnoubi
(74) *Attorney, Agent, or Firm* — Keating & Bennett, LLP (57) ABSTRACT

Interference is mitigated by effective knowledge and/or effective information about an interference signal. A higher layer in which a base station apparatus configures first interference information used for the terminal apparatus to mitigate interference from a cell-specific reference signal and/or second interference information used for the terminal apparatus to mitigate interference at least from a downlink shared channel; and a signal detection unit configured to mitigate the interference from the cell-specific reference signal based on the first interference information and to mitigate the interference at least from the downlink shared channel based on the second interference information.

4 Claims, 3 Drawing Sheets

(51) Int. Cl.
 H04W 92/10 (2009.01)
 H04W 16/06 (2009.01)
 H04W 72/04 (2009.01)
(52) U.S. Cl.
 CPC ......... *H04L 5/0053* (2013.01); *H04L 5/0073* (2013.01); *H04W 16/06* (2013.01); *H04W 92/10* (2013.01); *H04W 72/042* (2013.01)

(56) References Cited

OTHER PUBLICATIONS

Official Communication issued in International Patent Application No. PCT/JP2015/065507, dated Aug. 11, 2015.
MediaTek et al., "Study on Network-Assisted Interference Cancellation and Suppression for LTE", 3GPP TSG RAN Meeting #59, RP-130404, Feb. 26-Mar. 1, 2013, 7 pages.
Nvidia, "Remaining aspects of higher-layer signaling for NAICS", 3GPP TSG-RAN WG1 #77, R1-142588, May 19-23, 2014, 10 pages.
Ericsson, "NAICS parameters", 3GPP TSG-RAN WG2 #87, Tdoc R2-143509, Aug. 18-22, 2014, pp. 1-5.
Ericsson; "NAICS Functionality, Robustness and Configurability"; 3GPP TSG-RAN WG1#77; R1-142322; May 19-23, 2014; 6 pages.

\* cited by examiner

TERMINAL DEVICE AND INTEGRATED CIRCUIT

TECHNICAL FIELD

The present invention relates to a terminal apparatus and an integrated circuit.

BACKGROUND ART

In a communication system such as Wideband Code Division Multiple Access (WCDMA) (registered trademark), Long Term Evolution (LTE), and LTE-Advanced (LTE-A) in Third Generation Partnership Project (3GPP), and Worldwide Interoperability for Microwave Access (Wi-MAX), the communication area can be extended with a cellular configuration including a plurality of areas arranged as cells, the areas being covered by a base station apparatus (base station, transmission station, transmission point, downlink transmitter, uplink receiver, transmit antenna group, transmit antenna port group, component carrier, eNode B) or a transmission station conforming to the base station apparatus. The cellular configuration uses a common frequency between neighbor cells or sectors to increase the spectral efficiency.

However, in such a cellular configuration, a terminal apparatus (mobile station apparatus, receiving station, reception point, uplink transmitter, downlink receiver, mobile terminal, receive antenna group, receive antenna port group, User Equipment (UE)) in a cell edge region or a sector edge region is affected by interference (inter-cell interference or inter-sector interference) by transmit signals of base station apparatuses included in other cells or other sectors, which may reduce the spectral efficiency.

To counteract the inter-cell interference or the inter-sector interference, a terminal apparatus having enhanced reception performance (Advanced Receiver) has been provided. For example, NPL 1 describes an advanced receiver such as a Minimum Mean Square Error-Interference Rejection Combining (MMSE-IRC) receiver, an Interference cancellation Receiver, an Interference Suppression Receiver, and a Maximal Likelihood Detection (MLD) Receiver. Such a receiver can reduce restrictions caused by, for example, the inter-cell interference, thereby increasing the spectral efficiency.

The communication system adopts spatial multiplexing transmission (Multi Input Multi Output: MIMO) to effectively transmit data. The advanced receiver is used to suppress inter-stream interference (inter-layer interference or inter-antenna interference) caused during the spatial multiplexing transmission, thereby increasing the spectral efficiency.

CITATION LIST

Non Patent Literature

NPL 1: "Study on Network Assisted Interference Cancellation and Suppression for LTE," 3GPP TSG RAN Meeting #59, RP-130404, March 2013.

SUMMARY OF INVENTION

Technical Problem

An advanced receiver requires knowledge and/or information about an interference signal (for example, a parameter for demodulation) to mitigate interference. However, transmission of the knowledge and/or the information about the interference signal from a base station apparatus to a terminal apparatus may increase signaling overheads. If the base station apparatus transmits little knowledge and/or information about the interference signal to the terminal apparatus, the terminal apparatus has to estimate information about the interference signal, which may increase the computation amounts of the terminal apparatus.

In view of the foregoing, it is an object of the present invention to provide a base station apparatus, a terminal apparatus, and an integrated circuit which mitigate interference by effective knowledge and/or effective information about an interference signal.

Solution to Problem

To solve the problems described above, a terminal apparatus and an integrated circuit according to the present invention have the following configurations.

A terminal apparatus of the present invention is a terminal apparatus configured to communicate with a base station apparatus and includes a higher layer in which the base station apparatus configures first interference information used for the terminal apparatus to mitigate interference from a cell-specific reference signal and/or second interference information used for the terminal apparatus to mitigate interference at least from a downlink shared channel, and a signal detection unit configured to mitigate the interference from the cell-specific reference signal based on the first interference information and to mitigate the interference at least from the downlink shared channel based on the second interference information.

In the terminal apparatus of the present invention, the signal detection unit mitigates only the interference from the cell-specific reference signal in a case of only the first interference information being configure, and the signal detection unit mitigates the interference from the cell-specific reference signal and the interference from the downlink shared channel in a case of the first interference information and the second interference information being configured.

In the terminal apparatus of the present invention, the signal detection unit mitigates only the interference from the cell-specific reference signal in a case of the first interference information being configured, and the signal detection unit mitigates the interference from the cell-specific reference signal and the interference from the downlink shared channel in a case of the second interference information being configured.

An integrated circuit to be mounted to the terminal apparatus of the present invention includes a means in which a base station apparatus configures first interference information used for the terminal apparatus to mitigate interference from a cell-specific reference signal and/or second interference information used for the terminal apparatus to mitigate interference at least from a downlink shared channel, and a signal detection means configured to mitigate the interference from the cell-specific reference signal based on the first interference information and to mitigate the interference from at least the downlink shared channel based on the second interference information.

Advantageous Effects of Invention

The present invention realizes efficient mitigation of interference in wireless environments into which interference signals come.

DESCRIPTION OF EMBODIMENTS

A communication system of the present embodiment includes a base station apparatus (transmitter, cell, transmission point, transmit antenna group, transmit antenna port group, component carrier, or eNodeB) and a terminal apparatus (terminal, mobile terminal, reception point, receiving terminal, receiver, receive antenna group, receive antenna port group, or UE).

In the present embodiment, "X/Y" includes the meaning of "X or Y". In the present embodiment, "X/Y" includes the meaning of "X and Y". In the present embodiment, "X/Y" includes the meaning of "X and/or Y".

Figure 1:
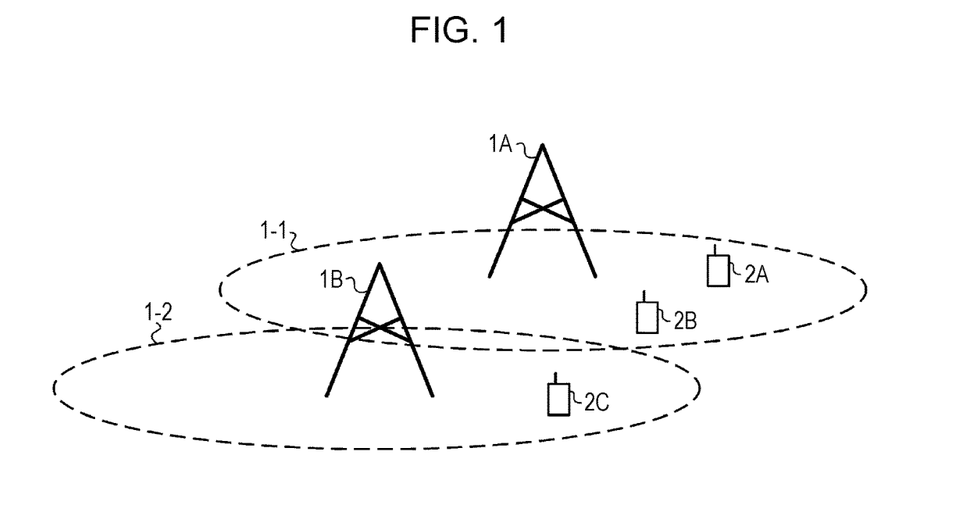
FIG. 1 is a view illustrating an example of a communication system according to an embodiment.

FIG. 1 is a view illustrating an example of the communication system according to the present embodiment. As illustrated in FIG. 1, the communication system of the present embodiment includes base station apparatuses 1A and 1B and terminal apparatuses 2A, 2B, and 2C. A coverage 1-1 is an area (communication area) in which the base station apparatus 1A is connectable to terminal apparatuses. A coverage 1-2 is an area (communication area) in which the base station apparatus 1B is connectable to terminal apparatuses. The terminal apparatuses 2A and 2B are hereinafter also referred to as terminal apparatuses 2.

In FIG. 1, when the base station apparatus 1A spatially multiplexes the terminal apparatus 2A and the terminal apparatus 2B, or when one of the terminal apparatuses 2 suffers from inter-cell interference from the base station apparatus 1B, a reception signal of the one terminal apparatus 2 includes a desired signal addressed to the one terminal apparatus 2 (also referred to as a first terminal apparatus) and a signal which is addressed to a terminal apparatus (also referred to as a second terminal apparatus) and which is to cause interference. Specifically, a reception signal of the terminal apparatus 2A includes a desired signal transmitted from the base station apparatus 1A to the terminal apparatus 2A and interference signals which are a signal transmitted to the terminal apparatus 2B and a signal transmitted from the base station apparatus 1B to the terminal apparatus 2C. A reception signal of the terminal apparatus 2B includes a desired signal transmitted from the base station apparatus 1A to the terminal apparatus 2B and interference signals which are a signal transmitted to the terminal apparatus 2A and the signal transmitted from the base station apparatus 1B to the terminal apparatus 2C.

As described above, in the present embodiment, there may be a case where the base station apparatus spatially multiplexes a plurality of terminal apparatuses and the terminal apparatuses thus suffer from inter-user interference and/or a case where the terminal apparatuses suffer from inter-cell interference from other base station apparatuses, and the present embodiment is not limited to the communication system of FIG. 1. Moreover, it is not a precondition that the terminal apparatuses suffer from the inter-user interference and the inter-cell interference at the same time, but the present invention covers both a case where the terminal apparatuses suffer from only the inter-user interference and a case where the terminal apparatuses suffer from only the inter-cell interference.

In FIG. 1, the following uplink physical channels are used for uplink wireless communication from each terminal apparatus 2 to the base station apparatus 1A. The uplink physical channels are used to transmit information output from a higher layer.

Physical Uplink Control Channel (PUCCH)
Physical Uplink Shared Channel (PUSCH)
Physical Random Access Channel (PRACH)

The PUCCH is used to transmit Uplink Control Information (UCI). Here, the uplink control information includes a positive acknowledgement (ACK) or a negative acknowledgement (NACK) (ACK/NACK) with respect to downlink data (downlink transport block, Downlink-Shared Channel: DL-SCH). The ACK/NACK with respect to the downlink data is also referred to as HARQ-ACK or HARQ feedback.

The uplink control information further includes Channel State Information (CSI) with respect to a downlink. The uplink control information also includes a Scheduling Request (SR) used to request a resource of an Uplink-Shared Channel (UL-SCH). The channel state information corresponds to, for example, a rank indicator RI specifying an optimal number of spatial multiplexing stream(s), a precoding matrix indicator PMI specifying an optimal precoder, or a channel quality indicator CQI specifying an optimal transmission rate.

The channel quality indicator CQI (hereinafter referred to as a CQI value) may be a most preferred modulation scheme (for example, QPSK, 16QAM, 64QAM, or 256QAM) or a coding rate in a predetermined band (described in detail later). The CQI value may be an index (CQI Index) specified by the modulation scheme or the coding rate. The CQI value may be a value predetermined in the system.

The rank indicator and the precoding quality indicator may be predetermined by the system. The rank indicator and the precoding matrix indicator may be indices specified by the number of spatial multiplexing stream(s) and/or precoding matrix information. Values of the rank indicator, the precoding matrix indicator, and the channel quality indicator CQI are collectively referred to as a CSI value.

The PUSCH is used to transmit uplink data (uplink transport block, UL-SCH). The PUSCH may be used to transmit the ACK/NACK and/or the channel state information together with the uplink data. The PUSCH may be used to transmit only the uplink control information.

The PUSCH is also used to transmit an RRC message. The RRC message is information/a signal processed in a Radio Resource Control (RRC) layer. The PUSCH is used to transmit a MAC Control Element (CE). Here, the MAC CE is information/a signal processed (transmitted) in a Medium Access Control (MAC) layer.

For example, a power headroom may be included in the MAC CE and reported via the PUSCH. That is, the field of the MAC CE may be used to show the level of the power headroom.

The PRACH is used to transmit a random access preamble.

In the uplink wireless communication, an Uplink Reference Signal (UL RS) is used as an uplink physical signal. The uplink physical signal is not used to transmit information output from the higher layer but is used by a physical layer. Here, the uplink reference signal includes a Demodulation Reference Signal (DMRS) and a Sounding Reference Signal (SRS).

The DMRS has a connection with transmission of the PUSCH or the PUCCH. For example, the base station apparatus 1A uses the DMRS to perform channel correction on the PUSCH or the PUCCH. The SRS has no connection with transmission of the PUSCH or the PUCCH. For example, the base station apparatus 1A uses the SRS to measure the uplink channel state.

In FIG. 1, downlink wireless communication from the base station apparatus 1A to each terminal apparatus 2 uses the following downlink physical channels. The downlink physical channels are used to transmit information output from the higher layer.

Physical Broadcast Channel; broadcast channel (PBCH)
Physical Control Format Indicator Channel; control format indicator channel (PCFICH)
Physical Hybrid automatic repeat request Indicator Channel; HARQ indicator channel (PHICH)
Physical Downlink Control Channel; downlink control channel (PDCCH)
Enhanced Physical Downlink Control Channel; enhanced downlink control channel (EPDCCH)
Physical Downlink Shared Channel; downlink shared channel (PDSCH)

The PBCH is used to broadcast a Master Information Block (MIB, Broadcast Channel: BCH) shared by the terminal apparatuses 2. The PCFICH is used to transmit information specifying a range used for transmission of the PDCCH (for example, the number of OFDM symbols).

The PHICH is used to transmit the ACK/NACK with respect to the uplink data (transport block, codeword) received by the base station apparatus 1A. That is, the PHICH is used to transmit a HARQ indicator (HARQ feedback) indicating the ACK/NACK with respect to the uplink data. The ACK/NACK is also referred to as HARQ-ACK. Each of the terminal apparatuses 2 notifies the higher layer of the received ACK/NACK. The ACK of the ACK/NACK indicates correct reception, and the NACK of the ACK/NACK indicates incorrect reception. DTX indicates that there is no corresponding data. When no PHICH exists for the uplink data, the terminal apparatus 2 notifies the higher layer of the ACK.

The PDCCH and the EPDCCH are used to transmit Downlink Control Information (DCI). Here, a plurality of DCI formats is defined with respect to transmission of the downlink control information. That is, fields with respect to the downlink control information are defined in the DCI formats and are mapped to information bits.

For example, a DCI format 1A used for scheduling of one PDSCH (transmission of one downlink transport block) in one cell is defined as a DCI format with respect to the downlink.

For example, the DCI format with respect to the downlink includes information about the resource allocation of the PDSCH, information about a Modulation and Coding Scheme (MCS) with respect to the PDSCH, and the downlink control information such as a TPC command with respect to the PUCCH. Here, the DCI format with respect to the downlink is also referred to as a downlink grant (or a downlink assignment).

For example, a DCI format 0 used for scheduling of one PUSCH (transmission of one uplink transport block) in one cell is defined as a DCI format with respect to the uplink.

For example, the DCI format with respect to the uplink includes information about the resource allocation of the PUSCH, information about the MCS with respect to the PUSCH, and the uplink control information such as a TPC command with respect to the PUSCH. The DCI format with respect to the uplink is also referred to as an uplink grant (or an uplink assignment).

The DCI format with respect to the uplink may be used to request Channel State Information (CSI: also referred to as reception quality information) of the downlink (CSI request). The channel state information corresponds to, for example, a Rank Indicator (RI) specifying an optimal number of spatial multiplexing stream(s), a Precoding Matrix Indicator (PMI) specifying an optimal precoder, or a Channel Quality Indicator (CQI) specifying an optimal transmission rate.

Moreover, the DCI format with respect to the uplink may be used for a configuration which indicates an uplink resource to which a channel state information report (CSI feedback report) fed back from the terminal apparatus to the base station apparatus is mapped. For example, the channel state information report may be used for a configuration which indicates an uplink resource to which periodic channel state information (Periodic CSI) is reported. The channel state information report may be used to configure a mode for periodically reporting the channel state information (CSI report mode).

For example, the channel state information report may be used for a configuration which indicates an uplink resource to which aperiodic channel state information (Aperiodic CSI) is reported. The channel state information report may be used to configure a mode for aperiodically reporting channel state information (CSI report mode). Base station apparatuses 100-1 and 100-2 may configure the periodic channel state information report or the aperiodic channel state information report. The base station apparatuses 100-1 and 100-2 may configure both the periodic channel state information report and the aperiodic channel state information report.

The DCI format with respect to the uplink may be used for a configuration which indicates a type of the channel state information report fed back from the terminal apparatus to the base station apparatus. Examples of the types of the channel state information report include broadband CSI (for example, Wideband CQI) and narrowband CSI (for example, Subband CQI).

Moreover, the DCI format with respect to the uplink may be used to configure a mode inclusively of the periodic channel state information report or the aperiodic channel state information report and the type of the channel state information report. Examples of the mode include a mode for the aperiodic channel state information report and for reporting the broadband CSI, a mode for the aperiodic channel state information report and for reporting the narrowband CSI, a mode for the periodic channel state information report and for reporting the broadband CSI and the narrowband CSI, a mode for the periodic channel state information report and for reporting the broadband CSI, a mode for the periodic channel state information report and for reporting the narrowband CSI, and a mode for the periodic channel state information report and for reporting the broadband CSI and the narrowband CSI.

When a resource of the PDSCH is scheduled by using the downlink assignment, the terminal apparatus 2 receives the downlink data via the scheduled PDSCH. When a resource of the PUSCH is scheduled by using the uplink grant, the terminal apparatus 2 transmits the uplink data and/or the uplink control information via the scheduled PUSCH.

The PDSCH is used to transmit downlink data (downlink transport block, DL-SCH). The PDSCH is used to transmit a system information block type 1 message. The system information block type 1 message is cell-specific (cell-specific) information.

The PDSCH is used to transmit a system information message. The system information message includes a system information block X other than the system information block type 1. The system information message is cell-specific information.

The PDSCH is used to transmit an RRC message. Here, the RRC message transmitted from the base station apparatus 1A may be shared by a plurality of terminal apparatuses 2 in a cell. Alternatively, the RRC message transmitted from the base station apparatus 1A may be a message dedicated to a terminal apparatus 2 (also referred to as dedicated signaling). That is, user apparatus-specific information is transmitted by using a message dedicated to the terminal apparatus 2. The PDSCH is used to transmit a MAC CE.

Here, the RRC message and/or the MAC CE are/is also referred to as higher layer signaling.

The PDSCH may be used to request downlink channel state information. The PDSCH may be used to transmit an uplink resource to which a channel state information report (CSI feedback report) fed back from the terminal apparatus to the base station apparatus is mapped. For example, the channel state information report may be used for a configuration which indicates an uplink resource to which periodic channel state information (Periodic CSI) is reported. The channel state information report may be used to configure a mode for periodically reporting the channel state information (CSI report mode).

Examples of the types of the downlink channel state information report include broadband CSI (for example, Wideband CSI) and narrowband CSI (for example, Subband CSI). The broadband CSI calculates one piece of channel state information with respect to the system band of a cell. The narrowband CSI partitions the system band into predetermined units of segments and calculates one piece of channel state information for each segment.

For the downlink wireless communication, a Synchronization Signal (SS) and a Downlink Reference Signal (DL RS) are used as downlink physical signals. The downlink physical signals are not used to transmit information output from the higher layer but are used by the physical layer.

The synchronization signal is used by the terminal apparatus 2 to synchronize between a downlink frequency domain and a time domain. The downlink reference signal is used by the terminal apparatus 2 to perform a channel correction of the downlink physical channel. For example, the downlink reference signal is used by the terminal apparatus 2 to calculate downlink channel state information.

Here, the downlink reference signal includes a Cell-specific Reference Signal (CRS), a UE-specific Reference Signal (URS) having a connection with the PDSCH, a Demodulation Reference Signal (DMRS) having a connection with the EPDCCH, a Non-Zero Power Chanel State Information-Reference Signal (NZP CSI-RS), and a Zero Power Chanel State Information-Reference Signal) ZP CSI-RS.

The CRS is transmitted in the entire band of a subframe and is used to demodulate the PBCH/PDCCH/PHICH/PC-FICH/PDSCH. The URS having a connection with the PDSCH is transmitted in a subframe and a band used for transmission of the PDSCH with which the URS has a connection, and the URS is used to demodulate the PDSCH with which the URS has a connection.

The DMRS having a connection with the EPDCCH is transmitted in a subframe and a band used for transmission of the EPDCCH with which the DMRS has a connection. The DMRS is used to demodulate the EPDCCH with which the DMRS has a connection.

The base station apparatus 1A configures the resource of the NZP CSI-RS. For example, the terminal apparatus 2 measures a signal (measures a channel) by using the NZP CSI-RS. The base station apparatus 1A configures the resource of the ZP CSI-RS. The base station apparatus 1A transmits the ZP CSI-RS with zero power. For example, the terminal apparatus 2 measures interference in a resource to which the NZP CSI-RS corresponds.

The base station apparatus 1A configures the resource of the ZP CSI-RS. The base station apparatus 1B transmits the ZP CSI-RS with zero power. That is, the base station apparatus 1A transmits no ZP CSI-RS. The base station apparatus 1B does not transmit the PDSCH or the EPDCCH in the configured resource of the ZP CSI-RS. For example, the terminal apparatus 2C may measure interference in a resource to which the NZP CSI-RS corresponds in a cell.

A Multimedia Broadcast multicast service Single Frequency Network (MBSFN) RS is transmitted in the entire band of the subframe used for transmission of a PMCH. The MBSFN RS is used to demodulate the PMCH. The PMCH is transmitted via an antenna port used for transmission of the MBSFN RS.

Here, the downlink physical channel and the downlink physical signal are collectively referred to as downlink signals. The uplink physical channel and the uplink physical signal are also collectively referred to as uplink signals. The downlink physical channel and the uplink physical channel are also collectively referred to as physical channels. The downlink physical signal and the uplink physical signal are collectively referred to as physical signals.

The BCH, the UL-SCH, and the DL-SCH are transport channels. A channel used in a MAC layer is referred to as a transport channel. The unit of the transport channel used in the MAC layer is referred to as a Transport Block (TB) or a MAC Protocol Data Unit (PDU). The transport block is the unit of data which the MAC layer delivers to the physical layer. In the physical layer, transport blocks are mapped to codewords, and an encoding process, and other processes are performed on each of the codewords.

The terminal apparatus may have a function of cancelling or suppressing the inter-user interference and/or the inter-cell interference. Such a technique has been investigated as Network Assisted Interference Cancellation and Suppression (NAICS) in the 3rd Generation Partnership Project (3GPP). In the NAICS, the base station apparatus transmits NAICS assistance information (also referred to as second assistance information) which the terminal apparatus uses to handle, cancel, or suppress interference signals. The terminal apparatus receives the NAICS assistance information, detects parameters based on the NAICS assistance information to cancel or suppress the interference signals, and cancels or suppresses the interference signals by using the parameters. The NAICS assistance information includes a part or all of a cell ID, the number of CRS antenna ports, an MBSFN subframe pattern, a PB, a virtual cell ID, a scrambling identity (nSCID), a PA, a transmission mode, quasi co-location information (QCL information), a ZP/NZP CSI-RS configuration, a PDSCH starting position, a TDD UL/DL configuration, a precoding matrix index/rank indicator, a modulation scheme, and resource allocation information.

The PA denotes the power ratio of a PDSCH in an OFDM symbol to which no CRS is mapped to a CRS. The PB denotes the power ratio of a PDSCH in an OFDM symbol to which a CRS is mapped to the PDSCH in an OFDM symbol to which no CRS is mapped. The QCL information is information relating to a QCL with respect to a predetermined antenna port, a predetermined signal, or a predetermined channel. If long-term characteristics of the channel via which a symbol on one of two antenna ports is transported can be estimated from a channel via which a symbol on the other of the antenna ports is transported, these antenna ports can be said to be in a QCL relationship. Examples of the long-term characteristics include delay spread, Doppler spread, Doppler shift, mean gain and/or mean delay. That is, when two antenna ports are in a QCL relationship, the long-term characteristics of the terminal apparatuses at their antenna port may be deemed to be identical to each other.

In each parameter included in the NAICS assistance information, one value (candidate) or a plurality of values (candidates) may be configured. When a plurality of values are configured, the terminal apparatus interprets the parameter as indication of values which may be configured by a base station apparatus which is to cause interference, and the terminal apparatus detects a parameter configured in an interference signal from the plurality of values. The NAICS assistance information may indicate information of other base station apparatuses or information of the base station apparatus corresponding to the terminal apparatus.

Note that the NAICS assistance information is used by a terminal apparatus in demodulating the PDSCH with respect to the terminal apparatus so as to handle, cancel, or suppress interference from a PDSCH with respect to other terminal apparatuses. Therefore, the NAICS assistance information is also referred to as PDSCH interference assistance information or PDSCH assistance information. The NAICS assistance information at least includes information about mapping to a resource element of a PDSCH with respect to other terminal apparatuses. The NAICS assistance information may be used in performing various measurements. Examples of the measurements include a Radio Resource Management (RRM), a Radio Link Monitoring (RLM) measurement, and a Channel State Information (CSI) measurement.

Based on the configured NAICS assistance information, the terminal apparatus detects (determines) PDSCH interference and mitigates the detected PDSCH interference. The NAICS assistance information may include quasi-static control information updated at a relatively low frequency and does not have to include dynamic control information updated at a relatively high frequency. Examples of the quasi-static control information include a cell ID, the number of CRS antenna ports, an MBSFN subframe pattern, a PB, a virtual cell ID, a scrambling identity (nSCID), a PA, a transmission mode, quasi co-location information (QCL information), a ZP/NZP CSI-RS configuration, a PDSCH starting position, and a TDD UL/DL configuration. The dynamic control information includes a precoding matrix index/rank indicator, a modulation scheme, resource allocation information, and other information. Moreover, as previously described, a plurality of values (candidates) may be configured in each parameter included in the NAICS assistance information. Thus, the NAICS assistance information may be deemed to be information for indicating a plurality of candidates of PDSCH interference. The terminal apparatus may perform blind detection in which detection is sequentially performed on the candidates of the PDSCH interference recognizable based on the NAICS assistance information.

The terminal apparatus can thus mitigate interference by the PDSCH with respect to other terminal apparatuses based on the parameter detected from the NAICS assistance information, and therefore, the terminal apparatus can accurately receive a signal transmitted thereto. Moreover, the NAICS assistance information indicates a plurality of candidates, and therefore, the influence on scheduling of the base station apparatus can be mitigated. It can be said that the terminal apparatus performs blind detection of parameters which have not been received as assistance information. The terminal apparatus may perform linear detection or non-linear detection to cancel or suppress interference signals. The terminal apparatus may perform the linear detection in consideration of the channel of a desired signal transmitted thereto and channels of interference signals transmitted to other terminal apparatuses. Such linear detection is referred to as Enhanced Linear Minimum Mean Square Error-Interference Rejection Combining (ELMMSE-IRC). As the non-linear detection, an interference canceller or maximum-likelihood detection may be performed.

The base station apparatus may transmit a NAICS assistance information list as a list of a piece of NAICS assistance information. The NAICS assistance information list may include at least one piece of the NAICS assistance information. The NAICS assistance information list may be transmitted as neighbor cell NAICS information (also referred to as second interference information). The NAICS assistance information list may be referred to as a PDSCH assistance information list. The neighbor cell NAICS information may be referred to as neighbor cell PDSCH information.

When the terminal apparatus suffers from interference from CRSs transmitted from other base station apparatuses, the terminal apparatus uses CRS assistance information (also referred to as first assistance information) transmitted by higher layer signaling from the base station apparatus corresponding to the terminal apparatus to mitigate the interference caused by the CRSs from other base station apparatuses. The CRS assistance information is information of the other base station apparatus and includes a cell ID, the number of CRS antenna ports, and an MBSFN subframe configuration list.

The CRS assistance information is listed in a CRS assistance information list, which is transmitted. The CRS assistance information list includes at least one piece of CRS assistance information. The CRS assistance information list is transmitted as neighbor cell CRS information (also referred to as first interference information).

Figure 2:
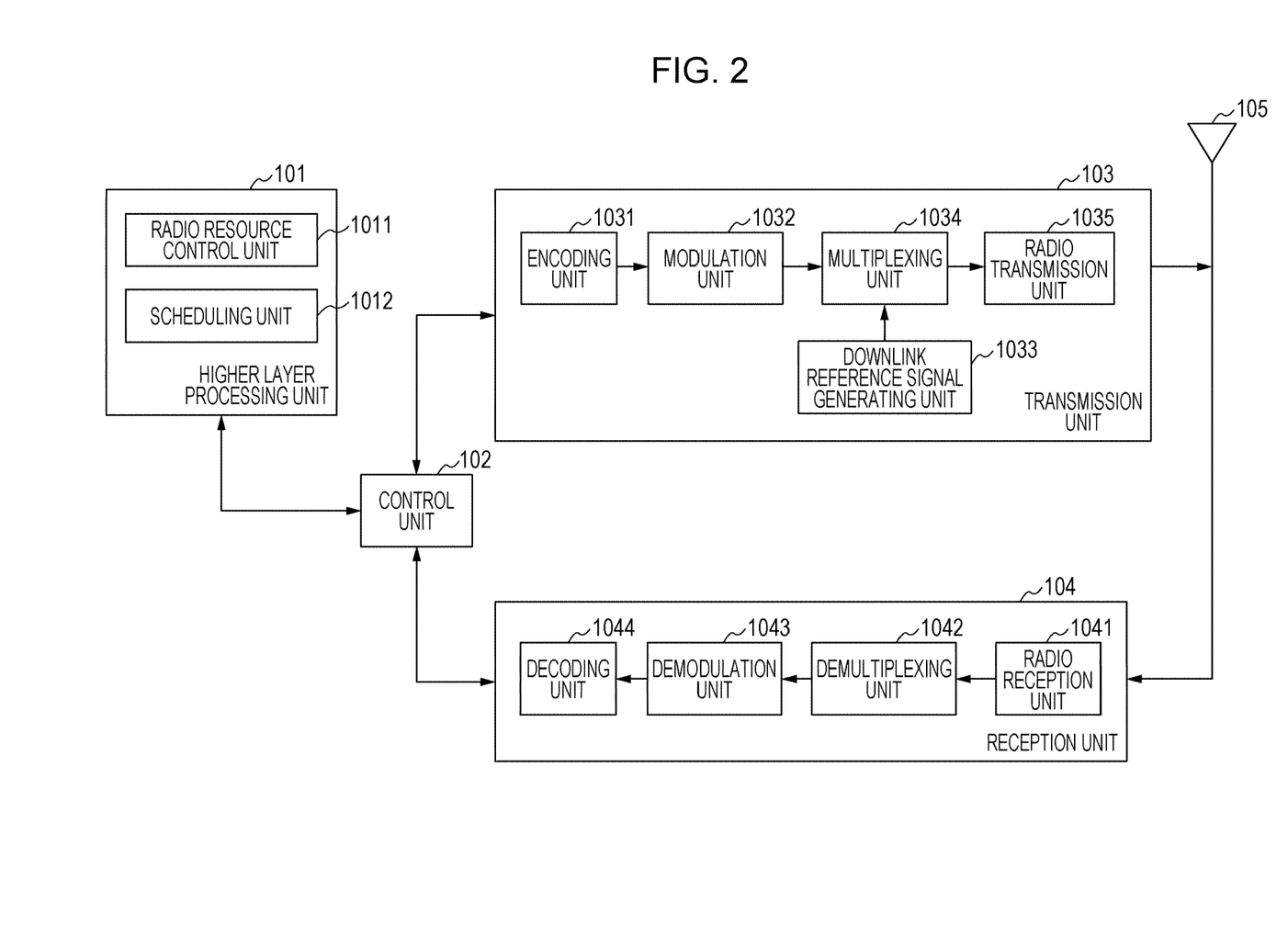
FIG. 2 is a block diagram illustrating a configuration example of a base station apparatus according to the embodiment.

FIG. 2 is a block diagram schematically illustrating the configuration of the base station apparatus 1A of the present embodiment. As illustrated in FIG. 2, the base station apparatus 1A includes a higher layer processing unit 101, a control unit 102, a transmission unit 103, a reception unit 104, and a transmit/receive antenna 105. The higher layer processing unit 101 includes a radio resource control unit 1011 and a scheduling unit 1012. The transmission unit 103 includes an encoding unit 1031, a modulation unit 1032, a downlink reference signal generating unit 1033, a multiplexing unit 1034, and a radio transmission unit 1035. The reception unit 104 includes a radio reception unit 1041, a demultiplexing unit 1042, a demodulation unit 1043, and a decoding unit 1044.

The higher layer processing unit 101 processes a Medium Access Control (MAC) layer, a Packet Data Convergence Protocol (PDCP) layer, a Radio Link Control (RLC) layer, and a Radio Resource Control (RRC) layer. The higher layer processing unit 101 generates information required to control the transmission unit 103 and the reception unit 104 and outputs the generated information to the control unit 102.

The higher layer processing unit 101 determines whether or not the NAICS assistance information is configured, or whether or not the CRS assistance information is configured.

The radio resource control unit 1011 generates, or obtains from a higher node, downlink data (transport block), system information, an RRC message, a MAC CE, and the like mapped to the PDSCH of the downlink. The radio resource control unit 1011 outputs the downlink data to the transmission unit 103 and the other information to the control unit 102. The radio resource control unit 1011 manages various configuration information of the terminal apparatus 2. The configuration information may include configuration information of a terminal apparatus which is to cause interference. Alternatively, from the configuration information of the terminal apparatus 2, configuration information of a terminal apparatus which is to cause interference may be obtained. The various configuration information may also include configuration information of a base station apparatus which is to cause interference.

The base station apparatus may transmit NAICS assistance information and CRS assistance information, or NAICS assistance information to a terminal apparatus capable of canceling NAICS and/or CRS interference. The following transmission method may be considered for the NAICS assistance information and the CRS assistance information.

When the NAICS assistance information and the CRS assistance information are configured in the higher layer, the base station apparatus may transmit the NAICS assistance information without information transmitted as the CRS assistance information being included in the NAICS assistance information. In order to associate CRS assistance information with NAICS assistance information, the index of pieces of the CRS assistance information included in the CRS assistance information list may be associated with the index of pieces of the NAICS assistance information included in the NAICS assistance information list. For example, when CRS assistance information 1 and CRS assistance information 2 are included in the CRS assistance information list, and NAICS assistance information 1 and NAICS assistance information 2 are included in the NAICS assistance information list, the NAICS assistance information 1 is associated with the CRS assistance information 1, and the NAICS assistance information 2 is associated with the CRS assistance information 2. In this case, the terminal apparatus may handle interference of the PDSCH based on information included in the NAICS assistance information 1 and the CRS assistance information 1. The number of pieces of CRS assistance information included in the CRS assistance information list may be the same as, or different from, the number of pieces of NAICS assistance information included in the NAICS assistance information list.

In order to associate the NAICS assistance information with the CRS assistance information, a cell ID may be included in the CRS assistance information and the NAICS assistance information. That is, the terminal apparatus may detect the cell ID included in the NAICS assistance information to obtain CRS-related information, that is, the number of CRS antenna ports and an MBSFN subframe configuration from the CRS assistance information associated with the cell ID. At this time, the terminal apparatus may cancel the CRS interference and handle an interference signal of the PDSCH based on the NAICS assistance information and the CRS assistance information.

When the NAICS assistance information includes no CRS assistance information, the NAICS assistance information may be transmitted only when the base station apparatus transmits the CRS assistance information. That is, only when the neighbor cell CRS information is configured, the base station apparatus may configure the neighbor cell NAICS information. Alternatively, the base station apparatus has to configure the neighbor cell CRS information (to an ON state) when the neighbor cell NAICS information is configured.

The terminal apparatus may determine a subframe for handling interference of the PDSCH based on the subframe pattern or a subframe configuration is configured in the higher layer to cancel the CRS interference.

When the NAICS assistance information is configured and no CRS assistance information is configured in the higher layer, the base station apparatus may transmit the NAICS assistance information inclusively of the cell ID and the CRS-related information. When the NAICS assistance information is configured and no CRS assistance information is configured in higher layer signaling, the terminal apparatus may handle interference relating to the PDSCH based on the NAICS assistance information and cancel the CRS interference based on the CRS-related information included in the NAICS assistance information. That is, in a method in which the NAICS assistance information is transmitted inclusively of the CRS-related information, the base station apparatus may be configured to transmit no CRS assistance information when the NAICS assistance information is transmitted, or configured to transmit no NAICS assistance information when the CRS assistance information is transmitted. That is, the base station apparatus may configure the neighbor cell NAICS information only when no neighbor cell CRS information is configured. Alternatively, the base station apparatus does not configure the neighbor cell CRS information (configures the neighbor cell CRS information to an OFF state) when the neighbor cell NAICS information is configured.

The base station apparatus may include the cell ID included in the CRS assistance information and the cell ID included in the NAICS assistance information which are identical with each other or which are all different from each other.

When the CRS assistance information is configured and no NAICS assistance information is configured in the higher layer, the terminal apparatus may cancel the CRS interference based on the CRS assistance information.

When the NAICS assistance information and the CRS assistance information are configured in the higher layer, the base station apparatus may configure the cell ID included in the NAICS assistance information and the cell ID included in the CRS assistance information which are different from each other. In this case, the terminal apparatus may handle the CRS interference and interference of the PDSCH based on the CRS-related information configured in the NAICS assistance information and further cancel CRS interference from another base station apparatus based on the CRS assistance information, in addition to the CRS interference canceled based on the NAICS assistance information.

The scheduling unit 1012 determines a frequency and a subframe to which physical channels (PDSCH and PUSCH) are to be assigned, the coding rate and the modulation scheme (or MCS) of the physical channel (PDSCH and PUSCH), a transmit power, and other information. The scheduling unit 1012 outputs the determined information to the control unit 102.

The scheduling unit 1012 generates information used for scheduling of the physical channels (PDSCH and PUSCH) based on a scheduling result. The scheduling unit 1012 outputs the generated information to the control unit 102. The present embodiment describes an example in which the scheduling unit 1012 schedules the terminal apparatus 2A and the terminal apparatus 2B for the same resource. Although the present embodiment uses the same resource for simplification, scheduling for different resources may be possible. Note that scheduling in cooperation with the base station apparatus 1B may be possible.

The control unit 102 generates a control signal based on information input from the higher layer processing unit 101 to control the transmission unit 103 and the reception unit 104. The control unit 102 generates downlink control information based on the information input from the higher layer processing unit 101 and transmits the downlink control information to the transmission unit 103.

The transmission unit 103 generates a downlink reference signal in accordance with the control signal input from the control unit 102, encodes and modulates the HARQ indicator, the downlink control information, and the downlink data input from the higher layer processing unit 101, multiplexes the PHICH, PDCCH, EPDCCH, PDSCH, and the downlink reference signal, and transmits the signal via the transmit/receive antenna 105 to the terminal apparatus 2.

The encoding unit 1031 encodes the HARQ indicator, the downlink control information, and the downlink data input from the higher layer processing unit 101 using a predetermined coding system such as block coding, convolutional coding, or turbo coding or using a coding system determined by the radio resource control unit 1011. The modulation unit 1032 modulates coding bits input from the encoding unit 1031 by using a predetermined modulation scheme such as Binary Phase Shift Keying (BPSK), quadrature Phase Shift Keying (QPSK), 16 quadrature amplitude modulation (QAM), 64QAM, or 256QAM, or by using a modulation scheme determined by the radio resource control unit 1011.

The downlink reference signal generating unit 1033 generates a sequence as a downlink reference signal. The sequence is obtained according to a rule predetermined based on, for example, physical cell identity (PCI, cell ID) used to identify the base station apparatus 1A and is known to the terminal apparatus 2.

The multiplexing unit 1034 multiplexes the modulation symbol of each modulated channel, the generated downlink reference signal, and the downlink control information. That is, the multiplexing unit 1034 maps the modulation symbol of each modulated channel, the generated downlink reference signal, and the downlink control information in the resource element.

The radio transmission unit 1035 performs Inverse Fast Fourier Transform (IFFT) of the multiplexed modulation symbol, and the like, to generate an OFDM symbol, adds a cyclic prefix (CP) to the OFDM symbol to generate a baseband digital signal, converts the baseband digital signal into an analog signal, cancels an excessive frequency component from the analog signal by filtering, up-converts the frequency of the analog signal to a carrier frequency, power-amplifies the analog signal, and outputs and transmits the analog signal from the transmit/receive antenna 105.

The reception unit 104 demultiplexes, demodulates, and decodes according to the control signal input from the control unit 102 the reception signal received via the transmit/receive antenna 105 from the terminal apparatus 2, and outputs the decoded information to the higher layer processing unit 101.

The radio reception unit 1041 down-converts an uplink signal received via the transmit/receive antenna 105 into a baseband signal, cancels unnecessary frequency components from the baseband signal, controls the amplification level to optimally maintain the signal level of the baseband signal, performs quadrature modulation of the base band signal based on the in-phase component and the quadrature component of the received signal to obtain an analog signal, and converts the analog signal obtained by the quadrature modulation into a digital signal.

The radio reception unit 1041 cancels a portion corresponding to the CP from the converted digital signal. The radio reception unit 1041 performs Fast Fourier Transform (FFT) on the signal from which the CP has been canceled, and the radio reception unit 1041 extracts a signal in a frequency domain and outputs the extracted signal to the demultiplexing unit 1042.

The demultiplexing unit 1042 demultiplexes the signal input from the radio reception unit 1041 into signals such as PUCCH, PUSCH, and an uplink reference signal. The demultiplexing operation is previously determined by the radio resource control unit 1011 of the base station apparatus 1A and is performed based on assignment information about the radio resource included in an uplink grant of which each terminal apparatus 2 is notified.

The demultiplexing unit 1042 compensates the PUCCH channel and the PUSCH channel. The demultiplexing unit 1042 also demultiplexes the uplink reference signal.

The demodulation unit 1043 performs Inverse Discrete Fourier Transform (IDFT) on the PUSCH, obtains a modulation symbol, and performs demodulation of reception signal on each of modulation symbols of the PUCCH and the PUSCH by using a predetermined modulation scheme such as BPSK, QPSK, 16QAM, 64QAM, or 256QAM or a modulation scheme of which the base station apparatus has previously notified each of the terminal apparatuses 2 by the uplink grant.

The decoding unit 1044 decodes the coding bits of the demodulated PUCCH and PUSCH at a coding rate of a predetermined coding system, where the coding rate is predetermined or the base station apparatus previously notify the terminal apparatuses 2 of the coding rate by the uplink grant, and the decoding unit 1044 outputs the decoded uplink data and the uplink control information to the higher layer processing unit 101. In case of retransmission of the PUSCH, the decoding unit 1044 performs decoding by using the coding bits in the HARQ buffer input from the higher layer processing unit 101 and the demodulated coding bits.

Figure 3:
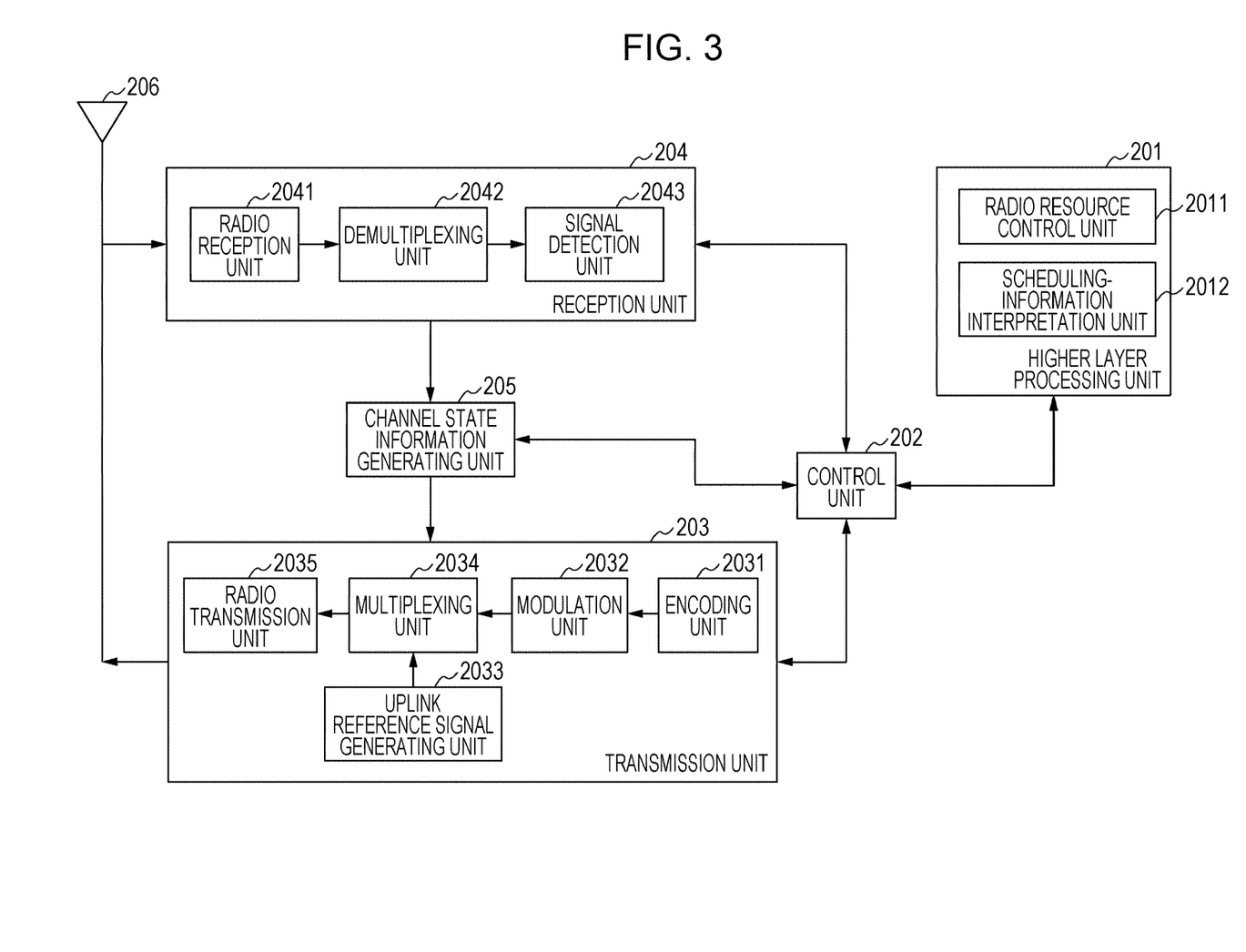
FIG. 3 is a block diagram illustrating a configuration example of a terminal apparatus according to the embodiment.

FIG. 3 is a block diagram schematically illustrating the configuration of a terminal apparatus 2 of the present embodiment. As illustrated in FIG. 3, the terminal apparatus 2 includes a higher layer processing unit 201, a control unit 202, a transmission unit 203, a reception unit 204, a channel state information generating unit 205, and a transmit/receive antenna 206. The higher layer processing unit 201 includes a radio resource control unit 2011, and a scheduling-information interpretation unit 2012. The transmission unit 203 includes an encoding unit 2031, a modulation unit 2032, an uplink reference signal generating unit 2033, a multiplexing unit 2034, and a radio transmission unit 2035. The reception unit 204 includes a radio reception unit 2041, a demultiplexing unit 2042, and a signal detection unit 2043.

The higher layer processing unit 201 outputs uplink data (transport block) generated by, for example, an operation by a user to the transmission unit 203. The higher layer processing unit 201 processes a Medium Access Control (MAC) layer, a Packet Data Convergence Protocol (PDCP) layer, a Radio Link Control (RLC) layer, and a Radio Resource Control (RRC) layer.

The radio resource control unit 2011 manages various pieces of configuration information of the terminal apparatus 2. The radio resource control unit 2011 generates information mapped each uplink channel and transmits the information to the transmission unit 203.

The radio resource control unit 2011 obtains the configuration information relating to the CSI feedback transmitted from the base station apparatus and outputs the configuration information to the control unit 202.

The scheduling-information interpretation unit 2012 interprets the downlink control information received via the reception unit 204 and determines the scheduling information. The scheduling-information interpretation unit 2012 generates control information based on the scheduling information to control the reception unit 204 and the transmission unit 203 and outputs the generated control information to the control unit 202.

The control unit 202 generates a control signal based on the information input from the higher layer processing unit 201 to control the reception unit 204, the channel state information generating unit 205, and the transmission unit 203. The control unit 202 outputs the generated control signal to the reception unit 204, the channel state information generating unit 205, and the transmission unit 203 to control the reception unit 204 and the transmission unit 203.

The control unit 202 controls the transmission unit 203 to transmit the CSI generated by the channel state information generating unit 205 to the base station apparatus.

According to the control signal input from the control unit 202, the reception unit 204 demultiplexes, demodulates, and decodes the reception signal received via the transmit/receive antenna 206 from the base station apparatus 1A, and outputs the decoded information to the higher layer processing unit 201. The reception unit 204 receives a reference signal included in the reception signal and corresponding to the base station apparatus 1A (also referred to as a first reference signal) and a reference signal based on the interference information configured from the base station apparatus 1A (also referred to as a second reference signal) and outputs the reference signals to the channel state information generating unit 205.

The radio reception unit 2041 down-converts a downlink signal received via the transmit/receive antenna 206 into a baseband signal, cancels unnecessary frequency components from the baseband signal, controls the amplification level to optimally maintain the signal level of the baseband signal, performs quadrature modulation of the base band signal based on the in-phase component and the quadrature component of the received signal to obtain an analog signal, and converts the analog signal obtained by the quadrature modulation into a digital signal.

The radio reception unit 2041 cancels a portion corresponding to the CP from the converted digital signal, performs Fast Fourier Transform on the signal from which the CP has been canceled, and extracts a signal in the frequency domain.

The demultiplexing unit 2042 demultiplexes the extracted signal into PHICH, PDCCH, EPDCCH, PDSCH, and downlink reference signals. The demultiplexing unit 2042 compensates the PHICH, PDCCH, and EPDCCH channels based on a channel estimation value of a desired signal obtained by channel measurement, detects downlink control information, and outputs the downlink control information to the control unit 202. The control unit 202 outputs the PDSCH and the channel estimation value of the desired signal to the signal detection unit 2043.

The signal detection unit 2043 detects a signal using the PDSCH and the channel estimation value and outputs the signal to the higher layer processing unit 201. When the NAICS is configured in the higher layer, an interference signal is canceled or suppressed to detect a signal. To cancel or suppress the interference signal, linear detection considering the channel estimation value of the interference signal, interference cancellation considering the channel estimation value and/or the modulation scheme of the interference signal, or maximum-likelihood detection is performed.

When the NAICS assistance information and the CRS assistance information are configured in the higher layer, the signal detection unit 2043 detects parameters required for estimation of an interference channel and/or demodulation of the interference signal based on the NAICS assistance information and the CRS assistance information associated with and a cell ID included in the NAICS assistance information. For a parameter to which a plurality of values is configured in the NAICS assistance information, blind detection of a configured value to the interference signal is performed with the plurality of values as candidates. For parameters which are not configured in the NAICS assistance information and the CRS assistance information, blind detection of a configured value to the interference signal is performed with values which may be configured by the system as candidates. The signal detection unit 2043 may cancel or suppress interference of the PDSCH by using the detected parameter. The signal detection unit 2043 may cancel interference of the CRS based on the CRS assistance information.

When the NAICS assistance information is configured but no CRS assistance information is configured in the higher layer, the signal detection unit 2043 detects a parameter required to estimate the channel of an interference signal and/or to demodulate the interference signal based on the NAICS assistance information. For a parameter to which a plurality of values is configured in the NAICS assistance information, blind detection of a configured value to the interference signal is performed with the plurality of values as candidates. Blind detection of a parameter which is not configured in the NAICS assistance information is performed. Even when no CRS assistance information is configured, the CRS interference is canceled based on information relating to a CRS included in the NAICS assistance information.

When the CRS assistance information is configured but no NAICS assistance information is configured in the higher layer, the signal detection unit 2043 does not cancel or suppress interference of the PDSCH but cancels the CRS interference based on the CRS assistance information.

The transmission unit 203 generates an uplink reference signal according to the control signal input from the control unit 202, encodes and modulates the uplink data (transport block) input from the higher layer processing unit 201, multiplexes the PUCCH, the PUSCH, and the generated uplink reference signal, and transmits the multiplexed signals via the transmit/receive antenna 206 to the base station apparatus 1A.

The encoding unit 2031 performs encoding such as convolutional coding and block encoding of the uplink control information input from the higher layer processing unit 201. The encoding unit 2031 performs turbo coding based on information used for scheduling the PUSCH.

The modulation unit 2032 modulates the coding bits input from the encoding unit 2031 in a modulation scheme such as BPSK, QPSK, 16QAM, and 64QAM notified by the downlink control information or a modulation scheme predetermined for each channel.

The uplink reference signal generating unit 2033 generates a sequence obtained by a predetermined rule (expression) based on an physical cell identity (PCI, referred to as for example, Cell ID) for identifying the base station apparatus 1A, a bandwidth to which the uplink reference signal is mapped, a cyclic shift notified by the uplink grant, and a value of a parameter with respect to generation of the DMRS sequence.

The multiplexing unit 2034 rearranges the modulation symbols of the PUSCH in parallel according to the control signal input from the control unit 202, and then performs Discrete Fourier Transform (DFT). The multiplexing unit 2034 multiplexes signals of the PUCCH and the PUSCH and the generated uplink reference signal for each transmit antenna port. That is, the multiplexing unit 2034 maps the signals of the PUCCH and the PUSCH and the generated uplink reference signal to the resource element of each transmit antenna port.

The radio transmission unit 2035 performs Inverse Fast Fourier Transform (IFFT) of the multiplexed signal to perform modulation in a SC-FDMA schema, generates a SC-FDMA symbol, adds a CP to the generated SC-FDMA symbol, generates a baseband digital signal, converts the baseband digital signal into an analog signal, cancels an excessive frequency component from the analog signal, converts the frequency of the analog signal into a carrier frequency, power-amplifies the analog signal, and outputs and transmits the analog signal to the transmit/receive antenna 206.

Programs which run on the base station apparatus and terminal apparatus of the present invention are programs for controlling a CPU, and the like (programs for operating a computer) to realize the functions of the embodiments relating to the present invention. Information processed in these apparatuses is temporarily accumulated in a RAM during processing, is then stored in various ROMs or HDDs, and is accordingly subjected to read, modify, and/or write operations by the CPU. The recording medium for storing the programs may be any of a semiconductor medium (for example, ROM, nonvolatile memory card, etc.), an optical recording medium (for example, DVD, MO, MD, CD, BD, etc.), a magnetic recording medium (for example, magnetic tape, flexible disk, etc.), and other media. The functions of the embodiments are realized by executing loaded programs, but the functions of the embodiments may also be realized by performing processes based on instructions of the programs in combination with an operating system, other application programs, and the like.

When the programs are released to the market, the programs can be stored on portable recording media or can be transferred to server computers connected via a network such as the Internet. In this case, memory of server computers is included in the present invention. Some or all of the functional units of the terminal apparatus and the base station apparatus of the embodiments may typically be realized as an LSI, which is an integrated circuit. The functional blocks of the receiver may be individually made into chips, or some or all of the functional blocks may be integrated into a chip. When functional blocks are made into an integrated circuit, an integrated circuit controlling unit for controlling the functional blocks is added.

A method for fabricating an integrated circuit is not limited to LSI but may be realized by using a dedicated circuit or a general purpose processor. When progress in semiconductor technology provides an integrated circuit technology replacing LSI, an integrated circuit formed by the provided integrated circuit technology can be used.

The invention of the present application is not limited to the embodiments described above. The terminal apparatus of the invention of the present application is not limited to application to the mobile station apparatus. The terminal apparatus is of course applicable to stationary or immovable electronic apparatuses, for example, AV equipment, kitchen appliances, cleaning/washing apparatuses, air conditioning apparatuses, office equipment, vending machines, and other living appliances installed indoors or outdoors.

While preferred embodiments of the invention have been described in detail with reference to the drawings, specific configurations are not limited to these embodiments, and designs and other modifications which do not depart from the spirit of the invention are included within the scope of the claims.

INDUSTRIAL APPLICABILITY

The present invention is suitable for use in terminal apparatuses and integrated circuits.

This PCT application claims the priority benefit of Japanese Patent Application No. 2014-119167 filed with the Japan Patent Office on Jun. 10, 2014, the content of which is incorporated herein by reference in its entirety.

REFERENCE SIGNS LIST 1A, 1B Base Station Apparatus
2A, 2B, 2C Terminal Apparatus
101 Higher Layer Processing Unit
102 Control Unit
103 Transmission Unit
104 Reception Unit
105 Transmit/Receive Antenna
1011 Radio Resource Control Unit
1012 Scheduling Unit
1031 Encoding Unit
1032 Modulation Unit
1033 Downlink Reference Signal Generating Unit
1034 Multiplexing Unit
1035 Radio Transmission Unit
1041 Radio Reception Unit
1042 Demultiplexing Unit
1043 Demodulation Unit
1044 Decoding Unit
201 Higher Layer Processing Unit
202 Control Unit
203 Transmission Unit
204 Reception Unit
205 Channel State Information Generating Unit
206 Transmit/Receive Antenna
2011 Radio Resource Control Unit
2012 Scheduling-Information Interpretation Unit
2031 Encoding Unit
2032 Modulation Unit
2033 Uplink Reference Signal Generating Unit
2034 Multiplexing Unit
2035 Radio Transmission Unit
2041 Radio Reception Unit
2042 Demultiplexing Unit
2043 Signal Detection Unit

The invention claimed is:

1. A base station apparatus, comprising:
transmission circuitry that transmits and/or is programmed to transmit first neighbor cell information or second neighbor cell information to a terminal apparatus, wherein
the first neighbor cell information and the second neighbor cell information are
information used by the terminal apparatus to mitigate interference from a neighbor cell,
the first neighbor cell information includes one or more pieces of first assistance information serving as information about a cell,
the second neighbor cell information includes one or more pieces of second assistance information serving as information about a cell,
the first assistance information includes information about a physical cell ID, information about the number of antenna ports of a cell-specific reference signal (CRS), and information about a Multimedia Broadcast multicast service Single Frequency Network (MBSFN) subframe,
the second assistance information includes at least information about a physical cell ID and information about the number of antenna ports of a CRS,
the interference mitigation based on the first neighbor cell information and the interference mitigation based on the second neighbor cell information are different capabilities of the terminal apparatus,
in a case where the terminal apparatus supports both the interference mitigation capabilities based on the first neighbor cell information and the second neighbor cell information, the transmission circuitry transmits the second neighbor cell information including CRS-related information if configuration of the first neighbor cell information is not present in a higher layer.

2. A method in a base station apparatus, comprising:
transmitting first neighbor cell information or second neighbor cell information to a terminal apparatus, wherein
the first neighbor cell information and the second neighbor cell information are
information used by the terminal apparatus to mitigate interference from a neighbor cell,
the first neighbor cell information includes one or more pieces of first assistance information serving as information about a cell,
the second neighbor cell information includes one or more pieces of second assistance information serving as information about a cell,
the first assistance information includes information about a physical cell ID, information about the number of antenna ports of a cell-specific reference signal (CRS), and information about a Multimedia Broadcast multicast service Single Frequency Network (MBSFN) subframe,
the second assistance information includes at least information about a physical cell ID and information about the number of antenna ports of a CRS,
the interference mitigation based on the first neighbor cell information and the interference mitigation based on the second neighbor cell information are different capabilities of the terminal apparatus,
in a case where the terminal apparatus supports both the interference mitigation capabilities based on the first neighbor cell information and the second neighbor cell information, the transmitting includes transmitting the second neighbor cell information including CRS-related information if configuration of the first neighbor cell information is not present in a higher layer.

3. A terminal apparatus, comprising:
reception circuitry that receives and/or is programmed to receive first neighbor cell information or second neighbor cell information from a base station apparatus, wherein
the first neighbor cell information and the second neighbor cell information are information used to mitigate interference from a neighbor cell,
the first neighbor cell information includes one or more pieces of first assistance information serving as information about a cell,
the second neighbor cell information includes one or more pieces of second assistance information serving as information about a cell,
the first assistance information includes information about a physical cell ID, information about the number of antenna ports of a cell-specific reference signal (CRS), and information about a Multimedia Broadcast multicast service Single Frequency Network (MBSFN) subframe,
the second assistance information includes at least information about a physical cell ID and information about the number of antenna ports of a CRS,
the interference mitigation based on the first neighbor cell information and the interference mitigation based on the second neighbor cell information are different capabilities of the terminal apparatus,
in a case where the terminal apparatus supports both the interference mitigation capabilities based on the first neighbor cell information and the second neighbor cell information, the reception circuitry receives the second neighbor cell information including CRS-related information if configuration of the first neighbor cell information is not present in a higher layer.

4. A method in a terminal apparatus, comprising:
receiving first neighbor cell information or second neighbor cell information from a base station apparatus, wherein
the first neighbor cell information and the second neighbor cell information are information used by the terminal apparatus to mitigate interference from a neighbor cell,
the first neighbor cell information includes one or more pieces of first assistance information serving as information about a cell,
the second neighbor cell information includes one or more pieces of second assistance information serving as information about a cell,
the first assistance information includes information about a physical cell ID, information about the number of antenna ports of a cell-specific reference signal (CRS), and information about a Multimedia Broadcast multicast service Single Frequency Network (MBSFN) subframe,
the second assistance information includes at least information about a physical cell ID and information about the number of antenna ports of a CRS,
the interference mitigation based on the first neighbor cell information and the interference mitigation based on the second neighbor cell information are different capabilities of the terminal apparatus,
in a case where the terminal apparatus supports both the interference mitigation capabilities based on the first neighbor cell information and the second neighbor cell information, the receiving includes receiving the second neighbor cell information including CRS-related information if configuration of the first neighbor cell information is not present in a higher layer.

* * * * *